US006129434A

United States Patent [19]

Melane et al.

[11] Patent Number: 6,129,434

[45] **Date of Patent: *Oct. 10, 2000**

[54] SUPPORT STRUCTURE FOR AN ELECTRONIC ENCLOSURE

[75] Inventors: Marcus L. Melane, Irving; Michael J. Pisterzi, Plano; Edward G. Mills, Prosper; Curtis L. Hargroves, Double Oak, all of Tex.

[73] Assignee: Alcatel USA Sourcing, L.P., Plano, Tex.

[ * ] Notice: This patent is subject to a terminal disclaimer.

[21] Appl. No.: 09/209,683

[22] Filed: Dec. 11, 1998

[51] Int. Cl.[7] .................................................... A47B 81/00

[52] U.S. Cl. .................................... 312/351.1; 312/223.1; 248/679

[58] Field of Search .................................... 248/679, 910; 52/297, 298; 211/26; 220/4.02, 4.03; 361/679, 600, 724; 312/223.1, 223.2, 351.1, 265.1, 265.4; 40/607, 608

[56] References Cited

U.S. PATENT DOCUMENTS

| | | | |
|---|---|---|---|
| 1,262,712 | 4/1918 | Stone | 248/910 X |
| 1,821,580 | 9/1931 | Rogers | 40/607 X |
| 3,099,244 | 7/1963 | Knapp . | |
| 4,438,606 | 3/1984 | Chardon et al. | 248/910 X |
| 5,088,245 | 2/1992 | Anderson | 52/653.1 X |
| 5,267,657 | 12/1993 | McGuiness et al. | 211/22 |
| 5,356,108 | 10/1994 | Stagl et al. | 248/910 X |

FOREIGN PATENT DOCUMENTS

| | | | |
|---|---|---|---|
| 6-90089 | 3/1994 | Japan | 312/257.1 |

*Primary Examiner*—Janet M. Wilkens
*Attorney, Agent, or Firm*—Locke Liddell & Sapp LLP

[57] ABSTRACT

A support structure for an electronic enclosure includes a base having a top wall, a bottom wall which is spaced apart from the top wall, a pair of spaced apart end walls disposed between the top and bottom walls, and a pair of spaced apart side walls disposed between the top and bottom walls. The walls are integrally attached and are disposed to form a hollow chamber. The top wall includes an aperture communicating with the chamber. Ballast is disposed within the chamber and is adapted to be inserted into the chamber through the top wall aperture. The base may be formed of rotationally molded plastic material.

7 Claims, 2 Drawing Sheets

42 42 40 42 42 10 20 34 34 22 34 12 14 30 18 16 24 16

SUPPORT STRUCTURE FOR AN ELECTRONIC ENCLOSURE

TECHNICAL FIELD OF THE INVENTION

The present invention relates to electronic enclosures, and more particularly to an integrated pad for supporting an electronic enclosure.

BACKGROUND OF THE INVENTION

Cabinet and enclosure designs, such as for example, enclosures for electronic components require a pad or foundation upon which the cabinet is mounted. The pad serves to support, locate, and restrain the cabinet in place.

Typically, pads consists of a template secured in a pre-cast or site-cast concrete foundation. Pouring concrete for either type of pad requires the building of a form, usually wooden, which contains the concrete until the concrete has "setup" or cured. The building of forms, pouring of concrete and finishing the concrete for such pads requires skilled craftspersons and many hours of labor.

Pre-cast pads have been utilized for foundations for enclosures. Such pre-cast pads are poured and cured at a central location utilizing reusable forms. Once cured, the pad is transported to the enclosure site. Pre-cast pads, although simplifying the manufacturing process, still required skilled craftspersons to pour and finish the concrete. An additional style of pad is a "bunker" style pad which is partially buried below ground level and serves multiple functions, such as a foundation for an enclosure, as well has having open space within the pad to accommodate cabling and storage. The bunker style pad requires internal structure to support the enclosure and must be watertight or include a method of drainage to remove ground water and/or seepage.

A need has thus arisen for a support structure for an electronic enclosure that is easy to assemble such that assembly can be accomplished on-site with minimal skilled labor.

SUMMARY OF THE INVENTION

In accordance with the present invention, a support structure for an electronic enclosure is provided. The structure includes a base having a top wall, a bottom wall which is spaced apart from the top wall, a pair of spaced apart end walls disposed between the top and bottom walls, and a pair of spaced apart side walls disposed between the top and bottom walls. The walls are integrally attached and are disposed to form a hollow chamber. The top wall includes an aperture communicating with the chamber. Ballast is disposed within the chamber and is adapted to be inserted into the chamber through the top wall aperture. The base may be formed of rotationally molded plastic material.

BRIEF DESCRIPTION OF THE DRAWINGS

For a more complete understanding of the present invention and for further advantages thereof, reference is now made to the following Description of the Preferred Embodiments taken in conjunction with the accompanying Drawings in which.

DESCRIPTION OF THE PREFERRED EMBODIMENTS

Figure 1:
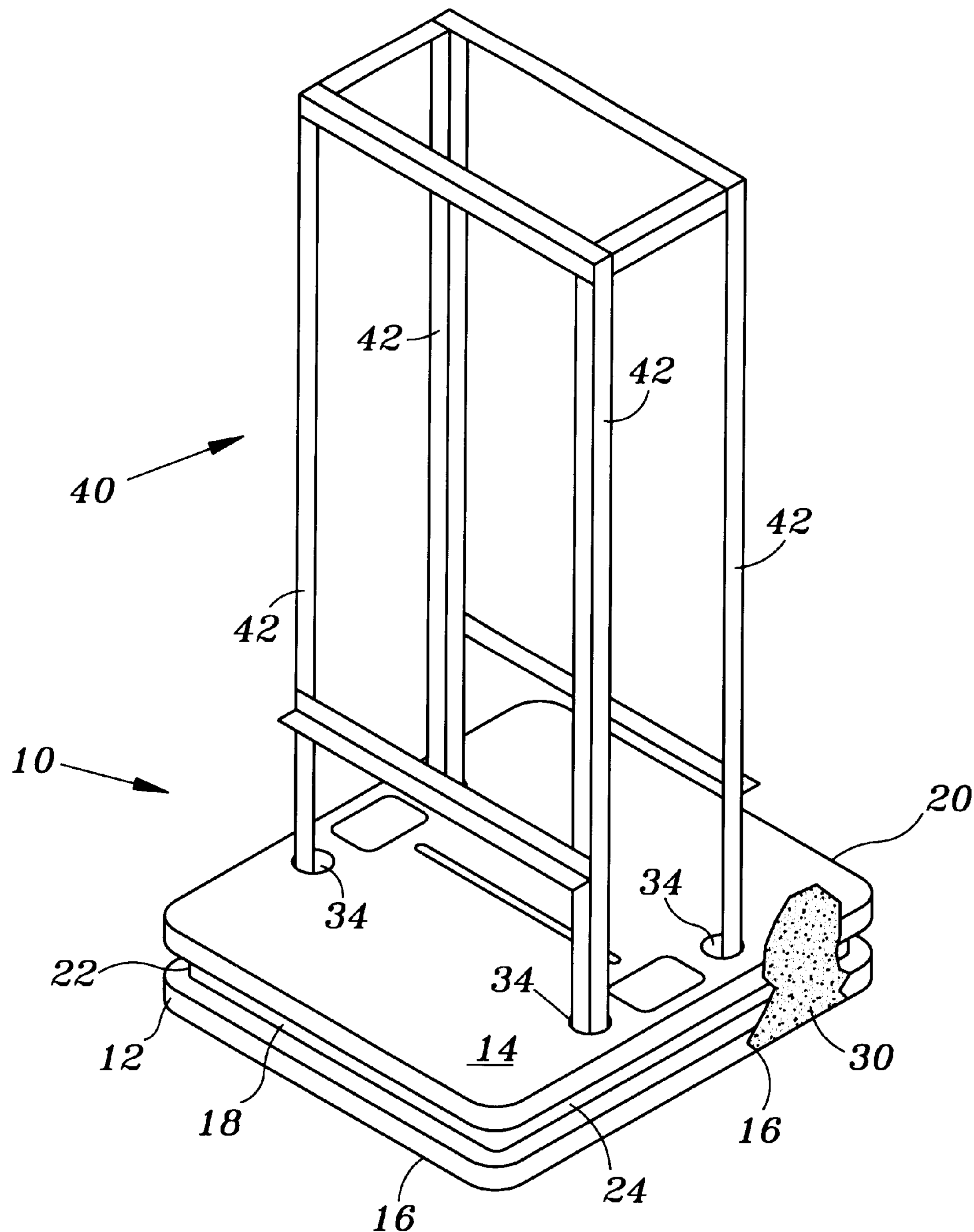
FIG. 1 is a perspective view of the present support structure including a frame for an electronic enclosure.

Referring to FIG. 1, a perspective view of the present pad or foundation, generally identified by the numeral 10 is illustrated. Pad 10 includes a base 12. Base 12 includes parallel and spaced apart top and bottom walls 14 and 16, respectively. Base 12 further includes spaced apart end walls 18 and 20, and spaced apart side walls 22 and 24. Walls 18, 20, 22, and 24 and top wall 14 and bottom wall 16 are integrally formed and disposed to form a hollow chamber 30.

Top wall 14 of base 12 includes apertures 34 which communicate with hollow chamber 30. Base 12 may be filled with ballast, such as, for example, concrete which is introduced into chamber 30 via apertures 34 contained within top wall 14.

Pad 10 may be fabricated at a location remote from the site of installation, transported to the site, and then filled with ballast at the site. Base 12 functions as the forms required for the pad 10. No additional forms are required for forming the base, thereby eliminating the time required to fabricate pad 10 as well as minimizing the requirement for skilled craftspersons in the fabrication process. Base 12 is lightweight for transportation purposes and for easy positioning of base 12 at the installation site.

Base 12 may be fabricated of a rotationally molded plastic material such as high density polyethylene and linear low density polyethylene rotational molding grade resins using rotational molding techniques well known to those skilled in the art.

Pad 10 may be used to mount a frame, generally identified by the numeral 40 having legs 42. Legs 42 are received within apertures 34 of base 12 prior to filling of chamber 30 with ballast. Once base 12 is filled with ballast, legs 42 are permanently secure and affixed to pad 10.

Figure 2:
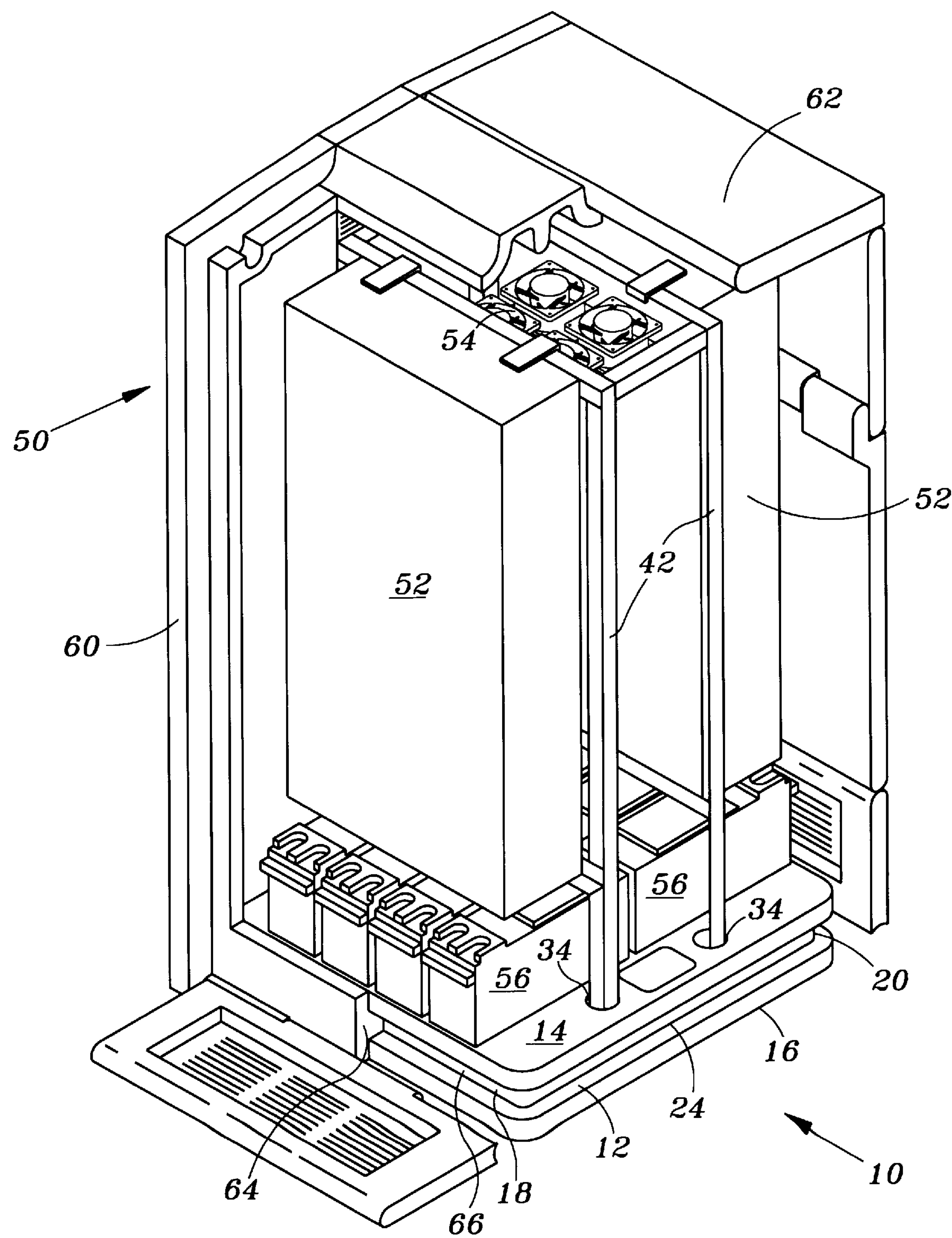
FIG. 2 is a perspective view of the present support structure together with an electronic enclosure.

FIG. 2 illustrates pad 10 serving as a foundation for an electronic enclosure 50, a portion of which has been removed for purposes of illustration. Electronic 50 includes electronic component modules 52 which are supported on frame 40. Frame 40 further supports ventilation equipment 54. Top wall 14 of base 12 supports storage batteries 56. Enclosure 50 includes a side wall 60 and a door 62. Side wall 60 is supported by pad 10. Side wall 60 includes a tongue 64 which is received within a groove or keyway 66 formed within end walls 18 and 20 of base 12. Side walls 60 of enclosure 50 therefore interlock into base 12 to form an integral electronic enclosure that is secured to pad 10.

It therefore can be seen that the present invention provides for a pad for an enclosure such that the pad is lightweight, easy to fabricate, and install without the need for skilled craftspersons and the construction of on-site forms. The present pad can be filled with ballast on site and provides the support for enclosure framing which can be integrally attached to the present pad using ballast.

Whereas the present invention has been described with respect to specific embodiments thereof, it will be understood that various changes and modifications will be suggested to one skilled in the art and it is intended to encompass such changes and modifications as fall within the scope of the appended claims.

We claim:

1. A support structure for an electronic enclosure comprising:

a base having a top wall, a bottom wall spaced apart from said top wall, a pair of spaced apart end walls disposed between said top wall and said bottom wall, and a pair of spaced apart side walls disposed between said top wall and said bottom wall, said walls being integrally attached and disposed to form a hollow chamber;

said top wall including an aperture communicating with said chamber;

ballast disposed within said chamber and adapted to be inserted into said chamber through said top wall aperture; and a frame for supporting the electronic enclosure disposed above said base top wall and having a plurality of legs communicating with said chamber, said top wall including a plurality of leg apertures for receiving said plurality of legs, such that said frame is supported by said ballast contained within said base.

2. The structure of claim 1 wherein said walls include high density polyethylene material.

3. The structure of claim 2 wherein said walls are formed by rotational molding.

4. The structure of claim 1 wherein said walls include linear low density polyethylene material.

5. The structure of claim 4 wherein said walls are formed by rotational molding.

6. The structure of claim 1 wherein said ballast includes concrete.

7. The structure of claim 1 wherein said walls are formed by rotational molding.

* * * * *